United States Patent [19]

Cheung et al.

[11] Patent Number: 5,087,306

[45] Date of Patent: * Feb. 11, 1992

[54] STRAPPING JOINT AND METHOD FOR FORMING SAME

[75] Inventors: Nelson Cheung, Hoffman Estates; Robert J. Nix, Algonquin; Janusz Figiel, Mt. Prospect, all of Ill.

[73] Assignee: Signode Corporation, Glenview, Ill.

[*] Notice: The portion of the term of this patent subsequent to Apr. 9, 2008 has been disclaimed.

[21] Appl. No.: 614,279

[22] Filed: Nov. 15, 1990

Related U.S. Application Data

[63] Continuation of Ser. No. 347,569, May 5, 1989, Pat. No. 5,006,385, which is a continuation-in-part of Ser. No. 223,482, Jul. 22, 1988, abandoned.

[51] Int. Cl.$^5$ .................. B65B 13/32; B29C 65/02
[52] U.S. Cl. .................... 156/73.5; 53/399; 100/3; 100/33 PB; 156/157; 156/308.4
[58] Field of Search ............ 100/33 PB, 3; 156/73.5, 156/93, 157, 308.4; 53/399; 428/57

[56] References Cited

U.S. PATENT DOCUMENTS

| 2,624,886 | 1/1953 | Herman | 428/57 |
|---|---|---|---|
| 3,346,441 | 10/1967 | Bird | 428/57 |
| 3,541,948 | 11/1970 | Sauer et al. | 100/3 |
| 3,545,795 | 12/1970 | Hertel et al. | 428/57 |
| 3,749,622 | 7/1973 | Sato et al. | 156/502 |
| 4,483,438 | 11/1984 | Kobiella | 100/33 PB |
| 4,569,870 | 2/1986 | Shinmi | 428/7 |
| 4,776,905 | 10/1988 | Cheung et al. | 156/73.5 |

*Primary Examiner*—Michael G. Wityshyn
*Attorney, Agent, or Firm*—T. W. Buckman; D. J. Breh

[57] ABSTRACT

An improved joint and method for providing the improved joint structure in joined or fused thermoplastic strap positioned about a package or article is disclosed. The improved joint includes means for increasing the peel separation resistance of overlapping portions of the joint above the peel separation resistance provided by a weldment between the overlapping portions providing for a joint strength that approaches the tensile strength of the strap material or weldment.

1 Claim, 1 Drawing Sheet

STRAPPING JOINT AND METHOD FOR FORMING SAME

This is a continuation of Ser. No. 07/347,569 filed May 5, 1989, now U.S. Pat. No. 5,006,385, which is a continuation-in-part of Ser. No. 07/223,482 filed July 22, 1988 abandoned.

BACKGROUND OF THE INVENTION

The present invention relates to an improved strapping joint and the method for providing the improved joint. More specifically the invention provides an improved joint structure in sealless joints of thermoplastic strapping.

In the recent past, Signode Corporation, the assignee of the entire interest in the present application, has developed several processes, tools and power strapping machines for joining the overlapping end portions of a tensioned thermoplastic strap loop by friction-fusion techniques, and these methods and apparatuses are typified by those disclosed and claimed in U.S. Pat. Nos. 3,331,312, 3,442,203, 3,442,732, 3,442,733, 3,442,734, 3,442,735, 3,494,280, 3,586,572, 3,669,799, 3,679,519 and 3,718,526.

The thermoplastic strap material used in the practice of the inventions disclosed in the above named patents have conventionally been oriented nylon, polypropylene and polyester. Straps formed from such materials are fabricated by generally similar techniques, as is disclosed, for example, in U.S. Pat. No. 3,394,045. According to this patent, polypropylene sheet material, which is subsequently sliced into straps, is stretched to obtain planar orientation of the micromolecular chains. The molecular orientation of the polypropylene resin in the sheet substantially increases the tensile strength along the lines of orientation. However, this also renders the opposing surfaces of the sheet susceptible to abrasion which could ultimately interfere with its use in a strapping apparatus. To overcome this, the surfaces of the sheet are subjected to flash-heating to effect fusion of the outer opposing layers but insufficient to cause fusion in the entire thickness of the sheet. The flash heating acts to smooth the opposing surface layers, but does not disrupt the molecular orientation of the rest of the sheet material so that the high tensile strength is retained. The formed sheet material is then sliced to produce straps. Slicing is done generally parallel to the molecular lines of orientation so that the straps have high tensile strength along their length. This makes excellent straps for use in the packaging of materials where a strap is drawn tightly around a package with overlapping end portions secured to each other in the form of a ligature. The overlapping end portions can be secured by securing means, which include strap seal, adhesive or weldment such as friction fusing or thermoweld.

One of the characteristics of fused joints formed in accordance with the teachings of the above patents is their exceptional tensile strength (i.e., resistance to forces applied in the direction of the length of the strap). A further characteristic of such joints is that the peel strength (i.e., resistance to forces applied normally to the length of the strap) is relatively low. Although the low peel strength of friction-fused joints is very useful in enabling the strap to be removed from the strapped article, on occasion it may also result in unintentional opening of the joint. For example, if the end of the outermost strap portion is snagged in the handling of the article the joint could peel open. It has also been found that peel forces are more apparent for thicker strap as opposed to thinner strap material. However, it is also an ongoing problem that some weld joints are subject to premature failure.

SUMMARY OF THE INVENTION

The present invention is directed to an improved strap joint having improved joint strength, through position control of the overlapping end portions of a thermoplastic strap on opposite sides of a joint weldment which are proximate the inner and outer surfaces of the overlapping end portions of the strap and to a method for forming the improved joint.

According to the invention, thermoplastic strap from a strap supply is passed around an article; drawn tightly into a loop with a leading end portion adjacent the article and a trailing end portion outermost from the article overlapping; the outer trailing portion of the strap is then cut; and, the overlapping portions are joined to one another, for example, by a resolidified thin layer of melted material from each of the overlapping strap portions provided by techniques known in the art, such as friction fusion or hot-knife methods.

The friction-fusion process may be practiced by positioning the overlapping portions of a thermoplastic strap between a pair of welding jaws having opposing strap-gripping surfaces. The gripping surfaces oscillate at a high frequency to effect a weldment.

The improved strap joint according to the invention inhibits peel by increasing the resistance of the overlapping portions of the strap on opposite sides of the weldment at the facing inner and outer surface of the strap to separation when the weldment is in tension, and thus the strap joint or weld can more consistently accommodate a tensile load on the strap approximately equivalent to the weld or strap tensile strength.

The basic manufacturing steps of the invention include:

1) providing a strap from a source of strapping about an article or articles with portions overlapping;
2) cutting the strap to length;
3) forming a joint at the overlapping portions of the thermoplastic strap surrounding the article by providing a weldment between the overlapping portions along at least a portion of the length of the overlapping portions;
4) maintaining the joint in a constrained position to provide an improved and more consistent joint strength characteristic during subsequent tensile loading of the overlapping portions; and,
5) providing means for increasing the peel separation of the overlapping portions at opposite sides of the weldment proximate the facing inner and outer surfaces of the overlapping portions when the overlapping portions are tensile loaded

BRIEF DESCRIPTION OF THE DRAWING

In the several figures of the drawing, like reference numerals identify like components, and in those figures.

DETAILED DESCRIPTION OF THE INVENTION

The present invention provides a method of conveniently and consistently providing for a weld joint of thermoplastic strapping generally formed about an article such as a package. Hereinafter, whenever referred to, the term opposite sides of the weldment means those sides of the weldment which are proximate the facing inner and outer surfaces of the overlapping portions of the strap respectively. The strapping is provided with a means for maintaining overlapping portions of the strap on opposite sides of the weldment portion of the joint in a relative proximate relationship and substantially non-separable in peel when tensioned such that the total joint strength consistently approaches the strap material or weldment tensile strength. More specifically, any unwelded length of the overlapping portions of the strap extending longitudinally beyond either end of the weldment are maintained in relative proximity to the mating strap inner and outer surface by the means which resists separation of the overlapping portions on the opposite sides of the weldment. Means according to the invention as described below which resists separation of the overlapping portions of the joint on opposite sides of the weldment prevents a condition referred to as "peel". The thermoplastic strap material may be any plastic-like material such as polypropylene or polyester, as known in the art but preferably is a material having a high I-V (intrinsic viscosity) such as polyethylene terephthalate having an intrinsic viscosity of at least 0.8.

Figure 1:
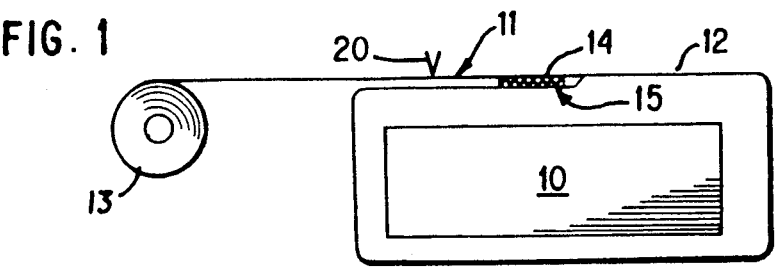
FIG. 1 is a schematic side-view illustration of a strap about a representative article.
Figure 3:
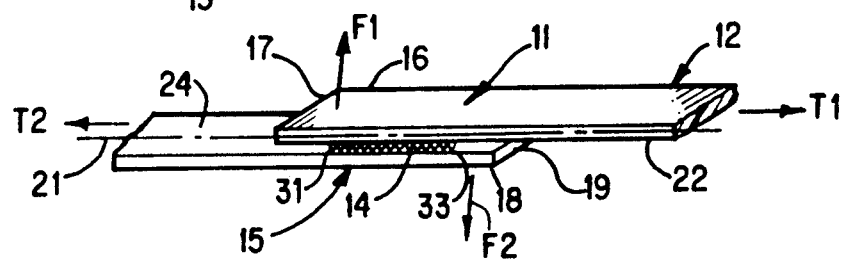
FIG. 3 illustrates a schematic weld joint between overlapping portions of thermoplastic strapping.

In the drawings, FIG. 1 illustrates a schematic view of a package 10 with a plastic strap 12 positioned or loosely draped about the package for securing it generally in anticipation of storage or shipment thereof. The strapped package or strapped material 10 of FIG. 1 includes: an illustration of a weld joint in the form of a weldment 14 along at least a portion of the surfaces of overlapping portions 11, 15 of the strap; and, an illustration of a knife means 20 for severing the strap material 12 about the package 10 from a source of strap 13. As shown in FIG. 3, a trailing end portion 16 and a leading end portion 18 of the overlapping portions 11, 15 of the strap refer to the terminus portions of strap 12 after it has been cut. As shown, the end portions 16 and 18 refer to unwelded overlapping strap lengths extending beyond the opposite ends 31, 33 of the weldment 14 and not just to the terminus points of the strap. As noted, the weldment 14 extends along at least a portion of the length of the overlapping portions, meaning that the weldment can, depending on the welding technique utilized, extend along either the entire length of the overlapping portions 11, 15 or along only a portion leaving at least one welded trailing or leading end portion 16, 18 as shown in FIG. 3.

Figure 2:
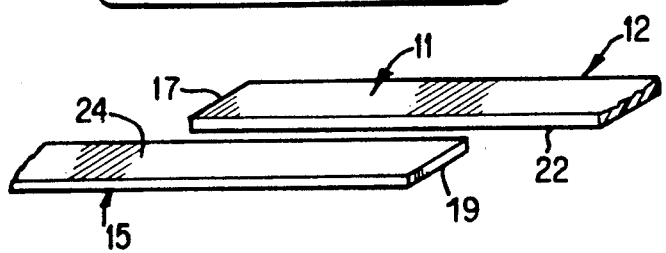
FIG. 2 illustrates an enlarged view of the overlapping portions of a strap joint as shown in FIG. 1.

FIG. 3 is an enlarged view of the overlapped trailing end portion 16 with first terminus 17 and the leading end portion 18 with second terminus 19 of strap 12. Strap 12 is shown as a thin walled, longitudinally extending material having an inner planar surface 22 to one side of the weldment which engages against the article 10 and an outer planar surface 24 on the opposite side of the weldment disposed outer-most from the article which directional outer and inner reference indicates position in the several figures relative to the article. The overlapping portions 11, 15 are illustrated FIGS. 1 and 2 in their separated position prior to joining by any means known in the art, such as friction welding, adhesive or thermowelding. The overlapping portions are joined by the weldment 14 between the inner and outer surfaces, as noted along at least a portion of the length of the overlapping portions with any unwelded portions 16, 18 disposed on opposite ends 31, 33 of the weldment as shown in FIG. 3. As noted, the weldment 14 has a first end 31 in proximity to the strap outer trailing portion 16 and a second end 33 in proximity to the strap inner leading end portion 18. A tensile load is generally applied to the strap 12 on opposite sides of the joint after welding and the strength of the joint is noted by its resistance to separation in the weld joint under the tensile load. The tensile load strains in opposite directions on either side of weldment 14, as illustrated in FIG. 3 by arrows T1 and T2. This loading on either side of the weldment 14 may lead to strap separation at tensile loads significantly lower than either the tensile strength of the strap, or of the weld. The strap separation may be caused by peel, that is where the overlapping strap portions 11, 15 are peeled away from each other by generally vertically, oppositely-directed forces F1, F2 from bending moments acting on the overlapping portions 11, 15 on opposite sides of the weldment. These forces can cause separation or peel of the weldment at tensile forces significantly less than the tensile strength of either the weldment 14 or the strap. The present invention provides means for maintaining the overlapping portions 11, 15 including any unwelded leading overlapping end portion 18 and trailing overlapping end portion 16 in proximity to and substantially non-separated from the corresponding adjacent overlapping portion when the joint is in tension, which means operates to increase the peel separation resistance of the overlapping portions 11, 15 including portions 16, 18 on opposite sides of the weldment and thus reduces the likelihood of premature weld separation and strap failure when the joint is tensioned. The means for increasing the peel separation resistance is further shown by the several embodiments illustrated in FIGS. 4–7.

Figure 4:
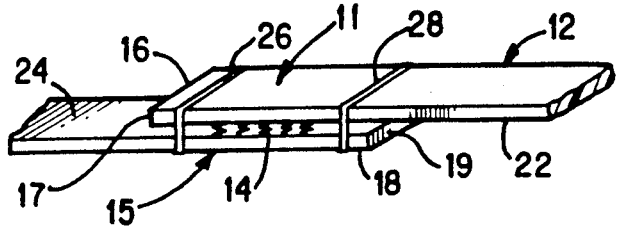
FIG. 4 is a schematic illustration of a first embodiment of an improved joint structure according to the invention.
Figure 7:
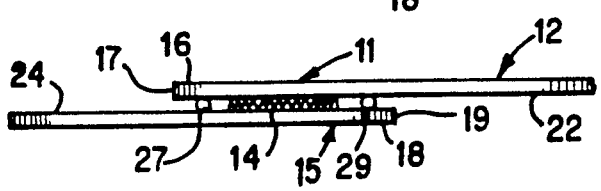
FIG. 7 illustrates a still further embodiment of the improved joint structure according to the invention

A first embodiment of the present invention is shown in FIG. 4. In this embodiment, the strap 12 is applied about a package 10. The overlapping strap portions 11, 15, are joined or welded together by a weldment 14, by means known in the art. As illustrated, first separation resisting means 26 and second separation resisting means 28 are provided about the strap overlapping portions 16 and 18, which physically or mechanically resists vertical forces acting on the overlapping portions 16, 18 on opposite sides of the weldment 14 during tensile loading of the strap 12 and joint. The resisting means 26 and 28, for example, may be wire, tape or spot weldments at the outer edges of strap 12. Spot weldments 27 and 29 in FIG. 7 illustrate physically securing the outer and inner overlapping portions 16, 18 on the opposite ends of the weldment 14 together which increase the resistance of the overlapping portions 11, 15 on opposite sides of the weldment to peel separation. Thereafter, the applied tensile load-to-failure has been found to consistently approach the tensile strength of strap 12. Strap 12 is thus allowed to realize the full tensile load at the weldment without concern of failure from peel at the weldment.

Figure 5:
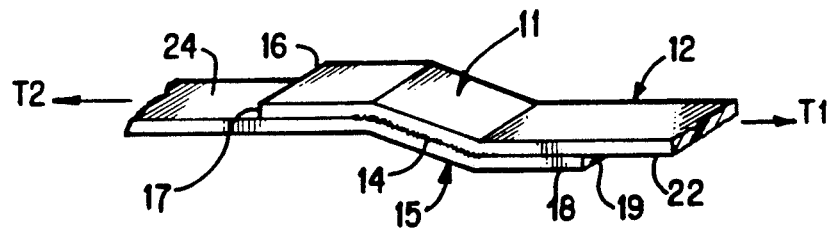
FIG. 5 is an alternative embodiment of an improved joint structure according to the invention.

A second, or alternative, embodiment of the present invention is illustrated in FIG. 5 wherein the overlapping portions 11, 15 have been overlapped and welded. Weldment 14 has been appropriately provided along at least a portion of the length of the inner and outer surfaces 22, 24 with the trailing end overlapping portion 16 and the leading end overlapping portion 18 on opposite ends of the weldment 14 however, as noted, depending on the welding technique used, the weldment can extend along the entirety of the overlapping portions. Prior to tensile loading, the strap is bent deformed or shaped in a Z-like form either during or immediately after the welding process by laterally relatively displacing the strap such that the strap portions 16, 18 that extend beyond the ends of the weldment lie on opposite sides of the then angularly disposed connecting plane of the weldment and preferably to lie in parallel planes with each other. Strap 12 in the illustrated embodiment generally defines a plane with a longitudinal axis, 21 in FIG. 3, along the mating inner and outer surfaces 22, 24 of strap 12 as shown in FIG. 3. In FIG. 3 the overlapping portion 16 prior to tensile loading is normally disposed with inner and outer surfaces 22, 24 co-planer but in the absence of the present invention the outer strap portion at side 16 would generally be displaced in a direction normally away from outer surface 24 upon tensile loading of strap 12. Similarly, the overlapping portions at side 18 are shown in their normal position wherein inner and outer surfaces 22, 24 are also co-planer on that side of the weldment prior to tensile loading but which inner overlapping strap portion at side 18 would generally be displaced in a direction normally away from the plane of inner surface 22 after tensile loading of strap 12. It has been found that, by forming the overlapping portions either simultaneously with or after forming the weldment 14 so as to be on opposite sides of the plane of the weldment, when the strap 12 is allowed to elongate under a tensile load T1, T2, the outer portion of the strap at the side 16 due to a normal force acting on the outer portion of the strap at side 16 and the inner overlapping portion of the strap at side 18 moves to contact or at least resist separation from the inner surface 22 of the adjoining overlapping portion at side 18 due to an oppositely directed normal force acting on the inner portion of the strap at side 18. The overlapping portions 16, 18 on opposite ends of the weldment are thus maintained substantially non-separable under tension and the resistance of the overlapping portions 11, 15 to peel separate is increased.

Figure 6:
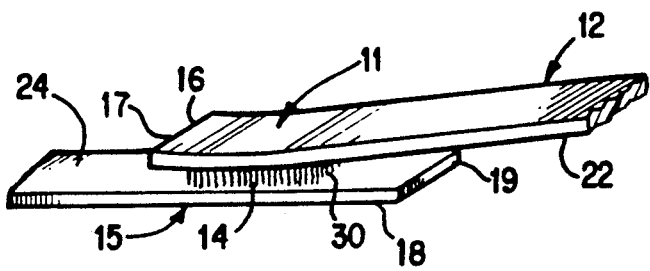
FIG. 6 illustrates a second alternative embodiment of an improved joint structure according to the invention.

A third, or second alternative, embodiment is illustrated in FIG. 6 wherein the outer overlapping strap portion 11 is curved radially outward or convex relative to the outer strap surface 24 on opposite sides of the weldment. The deformation, or forming, of the outer overlapping strap portion is provided near weldment 14 prior to resolidification of the molten or semi-plastic material state at weldment 14. This deformation, while the weldment or joining material between the overlapped strap portions is in its semi-molten state, stretches or elongates the molten material normal to the surface at the ends of the weld. This semi-molten plastic material resolidifies and generally forms a honeycomb shape, stretched plastic or stalactite-stalagmite structure 30 at either ends 31, 33 of the weldment. This structure provides for increasing the resistance to peel separation of the overlapping portions 11, 15 at both ends 31, 33 of the weldment during strap 12 tensile loading. The predetermined deformation stretched plastic structure should provide for a slight separation between the strap outer surface 24 and the strap inner surface 22 of preferably at least equal to about one strap thickness.

While it has been noted, that the weldment portion 14 of the joint can be effected by well known means, the preferred weldment is one created by friction fusing wherein at least one of the overlapping strap portion, for example the outer portion, is rapidly transversely oscillated relative to the adjoining overlapping strap portion, for example the inner portion, while the two portions are pressed together so as to create a sense-molten state of the plastic which when allowed to resolidify joins to form the weldment. Known friction fusing methods and the tool for carrying out the known methods allow the semi-molten plastic to resolidify during a period wherein the relative oscillatory motion of the overlapping strap porions is damping out under opposing frictional and inertial forces principally from the tool. This slow damping out during resolidification disrupts the integrity of the plastic by introducing voids or inclusions into the weldment.

In contrast to these known methods, the preferred method for forming the friction fusion type weldment of the present invention is preferably made by abruptly stopping the relative motion of the overlapping strap portions when the semi-molten state of the plastic is reached so that the resolidification of the plastic will occur preferably with no or at least as little physical disruption as possible. Accordingly, the weldment portion of the total joint is stronger than known joints which in combination with the means described herein providing for resistance of the overlapping portions of the joint on opposite sides of the weldment to separate, and in particular the means disclosed in FIG. 5, provides a significantly stronger total joint than known joints.

It has been found that these various structures or embodiments provide for increasing the resistance of the overlapping portion of the strap joint on opposite sides of the joint weldment to peel separation above that heretofore provided solely by the weldment itself during the application of the tensile load to the strap and are effective in preventing peel separation of the weldment ends. The maintenance of the positional relationship of the overlapping portions of the strap joint on opposite sides of the joint weldment inherently provides the requisite position for enhancing tensile loading of the strap, and thus the improvement of the joint and the joint integrity.

While this invention has been described in connection with certain specific embodiments hereof, it is to be understood that this is by way of illustration and not by way of limitation; and the scope of the appended claims should be construed as broadly as the prior art will permit.

We claim:

1. A method of forming a joint between overlapping portions of a thermoplastic strap surrounding an article, the steps comprising:

surrounding the article with an untensioned length of thermoplastic strap with an inner surface of the strap facing the article and an outer surface of the strap facing away from the article and overlapping portions of the strap being untensioned;

joining the overlapping portions of the strap by providing a weldment between said inner and outer surfaces of the strap along at least a portion of the overlapping portions of the strap while the overlapping portions and the portion of the strap surrounding the article are both untensioned; and providing means for increasing resistance of said overlapping portions of the strap on opposite sides of said weldment to peel separate above a peel separation resistance provided by said weldment when said overlapping portions of the strap at said weldment are put in tension including providing means for creating opposing forces in response to the tension on said overlapping portions, which opposing forces act on said overlapping portions on opposite sides of said weldment in directions urging said overlapping portions on each of said opposite sides of said weldment together.

* * * * *